(12) United States Patent
Terree (10) Patent No.: US 12,363,238 B1
(45) Date of Patent: Jul. 15, 2025

(54) IMAGE CAPTURE DEVICE WITH A DATASTORE FOR PROCESS COMPONENT INTEGRATION

(71) Applicant: GoPro, Inc., San Mateo, CA (US)

(72) Inventor: Etienne Terree, Fontenay-Aux-Roses (FR)

(73) Assignee: GoPro, Inc., San Mateo, CA (US)

( * ) Notice: Subject to any disclaimer, the term of this patent is extended or adjusted under 35 U.S.C. 154(b) by 177 days.

(21) Appl. No.: 18/302,665

(22) Filed: Apr. 18, 2023

Related U.S. Application Data (60) Provisional application No. 63/406,923, filed on Sep. 15, 2022.

(51) Int. Cl.
*H04N 1/21* (2006.01)
*G06F 9/48* (2006.01)

(52) U.S. Cl.
CPC ........... *H04N 1/2133* (2013.01); *G06F 9/485* (2013.01)

(58) Field of Classification Search
CPC .. H04N 1/2133; H04N 1/2129; H04N 1/2137; G06F 9/485; G06T 1/60; G06T 1/20
See application file for complete search history.

(56) References Cited

U.S. PATENT DOCUMENTS

| | | | | |
|---|---|---|---|---|
| 6,112,017 A * | 8/2000 | Wise | ................... | G06F 12/0607 |
| | | | | 711/E12.003 |
| 6,650,365 B1 * | 11/2003 | Sato | ........................ | H04N 1/40 |
| | | | | 348/231.3 |
| 7,652,671 B2 * | 1/2010 | Nagao | ....................... | G06T 1/20 |
| | | | | 345/506 |
| 7,787,026 B1 * | 8/2010 | Flory | .................... | H04N 5/2628 |
| | | | | 382/300 |
| 9,313,358 B2 * | 4/2016 | Suzuki | ................. | H04N 1/2129 |
| 9,591,170 B2 * | 3/2017 | Yaguchi | ............... | H04N 1/2112 |
| 2005/0104979 A1 * | 5/2005 | Fukuoka | .............. | H04N 9/7925 |
| | | | | 386/E5.067 |
| 2007/0046820 A1 * | 3/2007 | Mead | ..................... | H04N 5/145 |
| | | | | 348/554 |
| 2008/0030598 A1 * | 2/2008 | Takagi | ................. | H04N 1/2158 |
| | | | | 386/E5.072 |
| 2010/0220216 A1 * | 9/2010 | Fishman | .............. | H04N 1/2137 |
| | | | | 348/E7.085 |
| 2011/0286683 A1 * | 11/2011 | Hori | .......................... | G06T 5/40 |
| | | | | 382/276 |
| 2012/0110224 A1 * | 5/2012 | Tanaka | ...................... | G06F 5/06 |
| | | | | 710/57 |
| 2018/0365796 A1 * | 12/2018 | Nakazono | ................. | G06F 9/38 |
| 2019/0043202 A1 * | 2/2019 | Ikeda | ....................... | H04N 23/60 |
| 2021/0037162 A1 * | 2/2021 | Kawaguchi | .......... | H04N 1/2129 |
| 2021/0125304 A1 * | 4/2021 | Terree | .................... | H04N 19/85 |

* cited by examiner

*Primary Examiner* — Timothy J Henn
(74) *Attorney, Agent, or Firm* — Esplin & Associates, PC (57) ABSTRACT

An image capture device stores in a datastore information used and generated by different process components (e.g., firmware components, software components) of the image capture device. The datastore modularizes process components of the image capture device. The datastore is used as a centralized information exchange system for process components so that no direct links exist between process components. The modularization of the process component via the datastore enables autonomy in process component development.

20 Claims, 5 Drawing Sheets

IMAGE CAPTURE DEVICE WITH A DATASTORE FOR PROCESS COMPONENT INTEGRATION

FIELD

This disclosure relates to an image capture device that uses a datastore to establish indirect connections between process components executed by the image capture device.

BACKGROUND

An image capture device may execute process components to capture and/or process visual content. Process components may require information generated by other process components. Direct exchange of information between the process components may make the design of the process components inflexible.

SUMMARY

This disclosure relates to utilizing a datastore for process component integration. An image capture device may include one or more of an image sensor, an optical element, non-transitory, machine-readable storage media, a processor, and/or other components. The image sensor may generate a visual output signal conveying visual information based on light that becomes incident thereon. The visual information may define visual content. The optical element may guide light within a field of view to the image sensor. The non-transitory, machine-readable storage media may store information organized in a datastore. The datastore may provide information storage for multiple process components executed by the image capture device. Information may be stored within the datastore so as to establish indirect connections between different process components with access to the datastore.

Capture and/or processing of the visual content by the image capture device may be controlled using one or more of the multiple process components executed by the image capture device. Individual process components executed by the image capture device may not have direct connections with other individual process components. The datastore may establish indirect connection between a first process component and a second process component. The first process component may not have direct connection with the second process component. The first process component may retrieve first information from the datastore, process the first information to generate second information, and store the second information in the datastore. The second process component may retrieve the second information from the datastore, process the second information to generate third information, and store the third information in the datastore.

A housing may carry one or more components of the image capture device. The housing may carry (be attached to, support, hold, and/or otherwise carry) one or more of an electronic storage, an image sensor, an optical element, a processor, and/or other components.

The electronic storage may store information relating to the image capture device, information relating to the datastore, information relating to process components, information relating to visual content, information relating to capture of visual content, information relating to processing of visual content, and/or other information. The electronic storage may include non-transitory, machine-readable storage media. The non-transitory, machine-readable storage media may be configured to store information organized in a datastore.

The datastore may be configured to provide information storage for multiple process components executed by the image capture device. Information may be stored within the datastore so as to establish indirect connections between different process components with access to the datastore. Individual process components executed by the image capture device may not have direct connections with other individual process components.

In some implementations, the multiple process components executed by the image capture device may include one or more firmware components, one or more software components, and/or other process components.

In some implementations, the indirect connections between the different process components established through the datastore may enable one or more existing process components to be changed or removed without a change in other existing process components.

In some implementations, the indirect connections between the different process components established through the datastore may enable one or more new process components to be added without a change in existing process components.

In some implementations, the indirect connections between the different process components established through the datastore may enable multiple versions of a given process component to exist simultaneously.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may have a size. The field of view may be less than 180 degrees. The field of view may be equal to 180 degrees. The field of view may be greater than 180 degrees.

The processor(s) may be configured by machine-readable instructions. Executing the machine-readable instructions may cause the processor(s) to facilitate utilizing a datastore for process component integration. The machine-readable instructions may include one or more computer program components. The computer program components may include one or more of a capture/process component, and/or other computer program components.

The capture/process component may be configured to control capture and/or processing of the visual content by the image capture device. Capture and/or processing of the visual content by the image capture device may be controlled using one or more of the multiple process components executed by the image capture device.

The datastore may establish indirect connection between a first process component, a second process component, and/or other process components. The first process component may not have direct connection with the second process component. The first process component may retrieve first information from the datastore, process the first information to generate second information, and store the second information in the datastore. The second process component may retrieve the second information from the datastore, process the second information to generate third information, and store the third information in the datastore.

In some implementations, information stored in the datastore may be retrievable without breaking real-time behavior of the image capture device. The information stored in the datastore may be retrieved to determine a state of the image capture device at a moment in time. The information stored in the datastore may be retrieved to determine a history of write and read actions by the multiple process components executed by the image capture device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
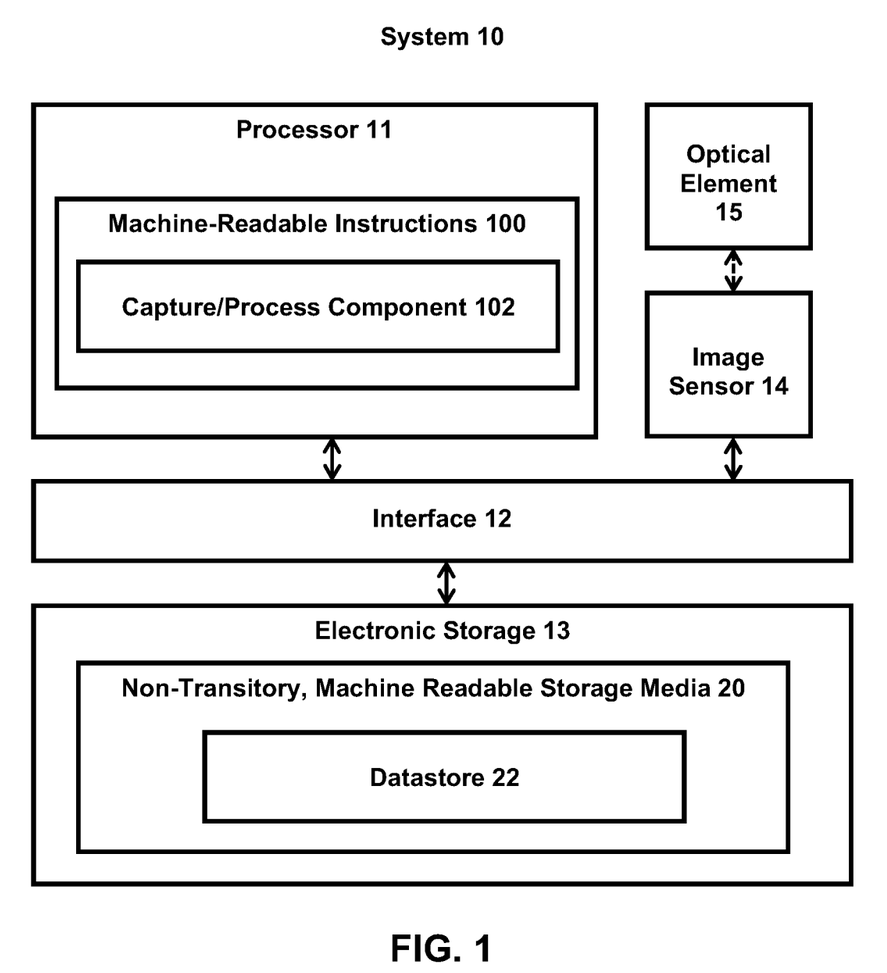
FIG. 1 illustrates an example system for utilizing a datastore for process component integration.

FIG. 1 illustrates a system 10 for utilizing a datastore for process component integration. The system 10 may include one or more of a processor 11, an interface 12 (e.g., bus, wireless interface), an electronic storage 13, an image sensor 14, an optical element 15, and/or other components. The image sensor 14 may generate a visual output signal conveying visual information based on light that becomes incident thereon. The visual information may define visual content. The optical element 15 may guide light within a field of view to the image sensor 14. The electronic storage 13 may include non-transitory, machine-readable storage media 20. The non-transitory, machine-readable storage media 20 may be configured to store information organized in a datastore 22. The datastore 22 may provide information storage for multiple process components executed by an image capture device. Information may be stored within the datastore 22 so as to establish indirect connections between different process components with access to the datastore 22.

Capture and/or processing of the visual content by the image capture device may be controlled by the processor 11 using one or more of the multiple process components executed by the image capture device. Individual process components executed by the image capture device may not have direct connections with other individual process components. The datastore 22 may establish indirect connection between a first process component and a second process component. The first process component may not have direct connection with the second process component. The first process component may retrieve first information from the datastore, process the first information to generate second information, and store the second information in the datastore. The second process component may retrieve the second information from the datastore, process the second information to generate third information, and store the third information in the datastore.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

An image capture device may refer to a device captures visual content. An image capture device may capture visual content in form of images, videos, and/or other forms. An image capture device may refer to a device for recording visual information in the form of images, videos, and/or other media. An image capture device may capture other content, such as audio content in form of sound clips.

An image capture device may be a standalone device (e.g., camera, image sensor) or may be part of another device (e.g., part of a smartphone, tablet). The image capture device may include a housing. The housing may refer a device (e.g., casing, shell) that covers, protects, and/or supports one or more components of the image capture device. The housing may include a single-piece housing or a multi-piece housing. The housing may carry (be attached to, support, hold, and/or otherwise carry) one or more of the processor 11, electronic storage 13, the image sensor 14, the optical element 15, and/or other components. The housing may carry other components of the image capture device, such as position sensor(s) (e.g., accelerometer, gyroscope, GPS sensor, inertial measurement unit) and/or sound sensor(s) (e.g., microphone).

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, electronic storage 13, the image sensor 14, the optical element 15, and/or other components of the system 10 may be carried by the housing of the image capture device.

The image sensor 14 may include sensor(s) that converts received light into output signals. The output signals may include electrical signals. The image sensor 14 may generate output signals conveying information that defines visual content of one or more images and/or one or more video frames of a video. For example, the image sensor 14 may include one or more of a charge-coupled device sensor, an active pixel sensor, a complementary metal-oxide semiconductor sensor, an N-type metal-oxide-semiconductor sensor, and/or other image sensors.

The image sensor 14 may be configured generate output signals conveying information that defines visual content of one or more images and/or one or more video frames of a video. The image sensor 14 may be configured to generate a visual output signal and/or other output signals. The visual output signal may convey visual information based on light that becomes incident on the image sensor 14 and/or other information. The visual output signal may convey visual information that defines visual content having a field of view. The optical element 15 may be configured to guide light within a field of view to the image sensor 14, and the image sensor 14 may be configured to generate visual output signals conveying visual information based on light that becomes incident thereon via the optical element 15.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 14 may include conversion of light received by the image sensor 14 into output signals/visual information defining visual content. Capturing visual content may include recording, storing, and/or otherwise capturing the visual content for use in generating video content (e.g., content of video frames). For example, during a capture duration, the visual output signal generated by the image sensor 14 and/or the visual information conveyed by the visual output signal may be used to record, store, and/or otherwise capture the visual content for use in generating video content.

In some implementations, the image capture device may include multiple image sensors. For example, the image capture device may include multiple image sensors carried by the housing to capture spherical images/videos based on light guided thereto by multiple optical elements. For instance, the image capture device may include two image sensors configured to receive light from two optical elements positioned on opposing sides of the housing. The fields of views of the optical elements may overlap and enable capture of spherical images and/or spherical videos.

The optical element 15 may include instrument(s), tool(s), and/or medium that acts upon light passing through the instrument(s)/tool(s)/medium. For example, the optical element 15 may include one or more of lens, mirror, prism, and/or other optical elements. The optical element 15 may affect direction, deviation, and/or path of the light passing through the optical element 15. The optical element 15 may have a field of view. The optical element 15 may be configured to guide light within the field of view to the image sensor 14.

The field of view of the optical element 15 may include the field of view of a scene that is within (e.g., observed through) the optical element 15 and/or the field of view of the scene that is delivered to the image sensor 14. For example, the optical element 15 may guide light within its field of view to the image sensor 14 or may guide light within a portion of its field of view to the image sensor 14. The field of view of the optical element 15 may refer to the extent of the observable world that is seen through the optical element 15. The field of view may have a size. The size of field of view of the optical element 15 may include one or more angles (e.g., vertical angle, horizontal angle, diagonal angle) at which light is received and passed on by the optical element 15 to the image sensor 14. In some implementations, the field of view may be greater than 180 degrees. In some implementations, the field of view may be equal to 180 degrees. In some implementations, the field of view may be less than 180 degrees.

In some implementations, the image capture device may include multiple optical elements. For example, the image capture device may include multiple optical elements that are arranged on the housing to capture spherical images/videos (guide light within spherical field of view to one or more images sensors). For instance, the image capture device may include two optical elements positioned on opposing sides of the housing. The fields of views of the optical elements may overlap and enable capture of spherical images and/or spherical videos.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to the datastore, information relating to process components, information relating to visual content, information relating to capture of visual content, information relating to processing of visual content, and/or other information.

An image capture device may include firmware and/or software to control operation of the image capture device. Software may refer to programs and/or other operation information used by the image capture device. Software may refer to instructions, data, and/or programs used to operate the image capture device and/or execute specific tasks. Firmware may refer to software that provides low-level control for the image capture device's hardware. Firmware may refer to software embedded/installed in a piece of hardware to make the hardware work as intended. For example, the firmware and/or software of the image capture device may control how visual content (of images, videos) are captured by the image capture device (e.g., when visual content capture is started/ended; camera setting used to capture visual content) and/or how visual content is processed by the image capture device (e.g., visual content analysis, automatic changes in visual characteristics of visual content, stabilization of visual content). The firmware and/or software of the image capture device may control how other content (e.g., metadata, audio content) are captured by the image capture device and/or how other content are processed by the image capture device.

Different components of firmware and/or software of the image capture device may be referred to as process components (process units) of the image capture device. A process component may refer to a component of firmware and/or software that obtains input and processes the input to generate output. A process component may refer to a particular algorithm, logic, process, and/or other part of the firmware and/or software.

Figure 3:
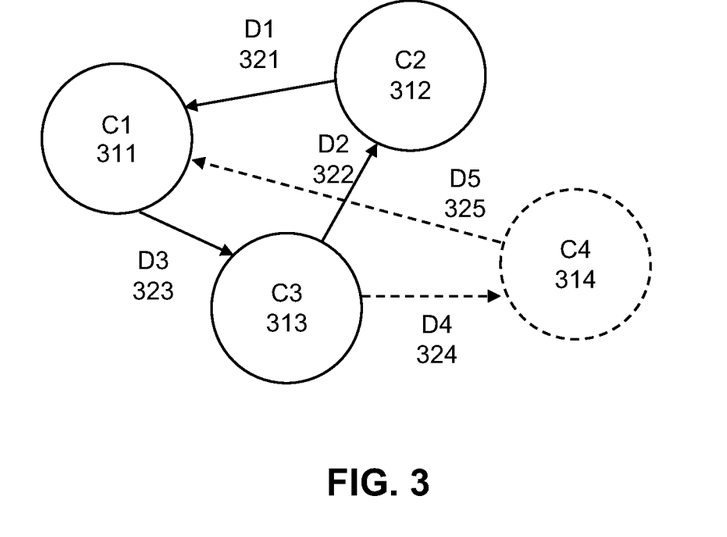
FIG. 3 illustrates example exchange of information between process components.

In a traditional design, inputs and outputs of process components may be connected together. FIG. 3 illustrates example exchange of information between process components. FIG. 3 may show connections between process components C1 311, C2 312, C3 313. Specific application programming interface (API) may exist for different process components to enable/control inputs and outputs of the different process components. For instance, process component C1 311 may utilize information D1 321 computed by process component C2 312. Process component C2 312 may utilize information D2 322 computed by process component C3 313. Process component C3 313 may utilize information D3 323 computed by process component C1 311.

Such architecture makes changes to process components difficult. For example, if a new process component C4 314 is added (to utilize information D4 324 computed by process component C3 313, and also to provide information D5 325 to process component C1 311), then the APIs of process component C1 311 and C3 313 must be changed. As another example, if a different version of process component C1 311 is desired (e.g., C1'), then process component C1 311 must be modified (e.g., into C1'). Both the original and modified versions of process component C1 311 cannot simultaneously exist without substantial changes to the process components. Similarly, removal of a process component requires changes to other process components.

Additionally, use of such architecture makes it difficult to monitor states of the image capture device or debug particular process components. Executing a spy function to read states and information from different process components may break the real-time behavior of the image capture device. For example, executing a spy function may cause one or more process components to not function properly. And isolation of a single process component is difficult/not possible.

The present disclosure utilize a datastore to modularize process components of the image capture device. The datastore may refer to a repository for storing, managing, and distributing information. The datastore may be a system-wide data warehouse. The datastore may be agnostic as to the type of information stored in the datastore. For example, the datastore may be used to store results of algorithm, GPS information, gyroscope information, image statistics information, and/or other types of information. The datastore may provide a unique place in which process components may find specific type of information. The datastore may provide a specific place in which process components may store specific type of information. Thus, the datastore may enable the image capture device to operate while avoiding same information being stored in multiple locations/multiple copies of information existing within memory. The datastore provides a unique place in which information is accessible by multiple process components using the same API. Process components may utilize pointers to have access to different information stored in the datastore.

The datastore may enable sequential access, timeline access, random access, consistent access of information by process components. The datastore may utilize circular storage of information, where oldest information in the datastore is removed to store new information. The datastore may ensure that information access from the datastore is thread safe. One or more flags may be used for specific information to indicate whether the information is being written or read. For example, query of specific information may place a lock on the information to prevent change to the information, and the lock may be released once the information has been read.

The image capture device may utilize a frame counter to keep track of video frames/images being captured and/or processed by the image capture device. The frame counter may be reset (e.g., back to 0) when the mode in which the image capture device operates is changed. For example, when the image capture device enters a preview mode, the frame counter may be set to 0 and increment by one for each frame that is captured/processed for preview. When the image capture device entered a recording mode, the frame counter may be set to 0 and increment by one for each frame that is captured/processed for recording.

The datastore may utilize a counter to simulate an absolute incremental frame index for the image capture device. When process components are executed at different frames, the counter may be used to keep track of the association between the information generated by the process components and the different frames. In some implementations, process components may be executed at different rates. For example, a first process component may be executed for every frame (e.g., frame 1, 2, 3, 4, 5, 6, etc.) while a second process component may be executed for every other frames (e.g., frame 1, 3, 5, etc.). A third process component may need a snapshot of information generated by the other two process components. If information from one of the process components is not available for a particular moment (e.g., frame 4 is missing information from the second process component), the next available information may be used. For example, the third process component may obtain and use information generated by first process component for frame 4 and information generated by the second process component for frame 5. The next available information, rather than previously available information, may be used as it is closer to the current time.

The datastore may utilize a combination of a sequence (epoch) that incremented with a frame counter that resets. The value of the sequence (epoch) may be incremented every time the frame counter of the image capture device is reset. The combination of the sequence (epoch) and the frame counter may provide a unique counter for every frame.

The datastore enables the process components executed by the image capture device to operate without having direct connection to other process components. The datastore enables the process components executed by the image capture device to retrieve information from the datastore and store information in the datastore, rather than directly communicating information to other process components. The datastore is used as a centralized information exchange system for multiple process components so that no direct links exist between multiple process components. The datastore serves as a proxy for communication between different process components.

The datastore enables orchestration/scheduling of multiple process components of the image capture device. The datastore enables multiple process components to be executed in parallel, with the timing of execution coordinated based on frame number, relationship between process components (e.g., a process component relying on output of another process component), and/or other information.

Figure 4:
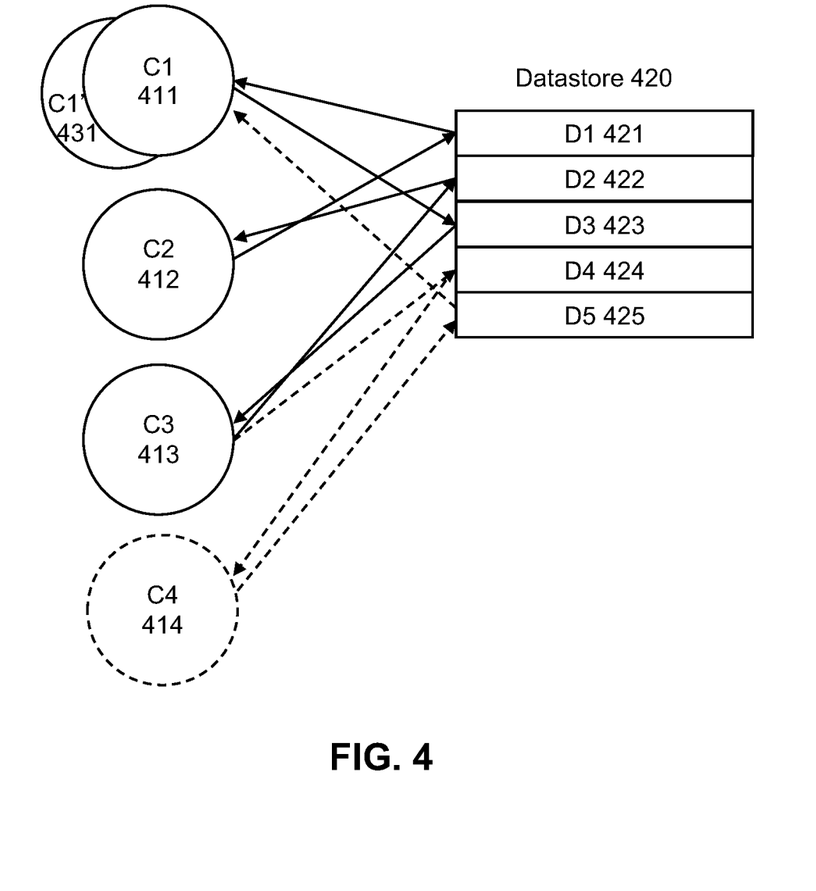
FIG. 4 illustrates example exchange of information between process components via a datastore.

An example of the datastore architecture is shown in FIG. 4. Process components C1 411, C2 412, C3 413 may obtain information needed for processing from a datastore 420, and information computed by one process component that is needed by another process component may be stored in the datastore 420. Information (individual data) stored in the datastore 420 may have a unique process component as its producer/generator and same information (same piece of data) may be used by one or multiple process components. For example, process component C1 411 may obtain information D1 421 from the datastore 420 and use it to generate information D3 423 for storage in the datastore 420. Process component C2 412 may obtain information D2 422 from the datastore 420 and use it to generate information D1 421 for storage in the datastore 420. Process component C3 may obtain information D3 423 from the datastore 420 and use it to generate information D2 422 for storage the datastore 420.

While FIG. 4 shows a single datastore 420, this is merely as an example and is not meant to be limiting. In some implementations, an image capture device may include multiple datastores. For example, separate datastores may be used for different types of information. The size of a datastore/a portion of a datastore dedicated to particular information may be static or dynamic. For example, the size of a datastore/a portion of a datastore dedicated to particular information may be set based on the amount of information that will be written. The size of a datastore/a portion of a datastore may be changed based on change in information storage requirements.

Referring back to FIG. 1, the electronic storage 13 may include non-transitory, machine-readable storage media 20. The non-transitory machine-readable storage media 20 may include one or more different types of non-transitory computer-readable media. The non-transitory machine-readable storage media 20 may store information for short periods of time and/or in the presence of power. The non-transitory machine-readable storage media 20 may include Random Access Memory (RAM) and/or other types of memory. The non-transitory, machine-readable storage media 20 may be configured to store information organized in a datastore 22.

The datastore 22 may be configured to provide information storage for multiple process components executed by the image capture device. The datastore 22 may be configured to provide information storage for individual process components executed by the image capture device. Information may be stored within the datastore 22 so as to establish indirect connections between different process components with access to the datastore 22. Rather than having different process component communicate information directly between each other, process components may be provided with access to the datastore 22 to read from and/or to write to the datastore 22. Indirection connections between different process components may be established based on access by the different process components of information stored in the datastore 22, and individual process components may not have direct connections with other individual process components.

In some implementations, the multiple process components executed by the image capture device may include one or more firmware components, one or more software components, and/or other process components. Components of image capture device firmware and/or software may access the datastore 22 to perform their functions. Examples of process components include auto exposure, auto white balance, tone mapping, high dynamic range processing, electronic image stabilization, auto color lens shading, object detection (e.g., face detection), classification (e.g., scene classification), black level calibration, image quality binary, and/or denoise. Other types of process components are contemplated.

The datastore 22 unifies communication between different process components. Individual process components may obtain information from the datastore as input, process the information obtained from the datastore to generate new information as output, and store the new information in the datastore. Individual process components may utilize the same API to access information stored in the datastore and to store information in the datastore. That is, a single, unified API may be used by multiple process components to obtain and store information in the datastore.

For example, the datastore 22 may establish indirect connection between a first process component, a second process component, and/or other process components. The first process component may not have direct connection with the second process component. The first process component may retrieve information from the datastore 22, process the information to generate another information, and store the other information in the datastore 22. The second process component may retrieve the information (e.g., generated and stored in the datastore 22 by the first process component) from the datastore 22, process the information to generate another information, and store the other information in the datastore 22.

The datastore 22 may store information generated and/or used by different process components. The datastore 22 may store related information, such as which process component stored a piece of information in the datastore, when the piece of information was stored, which process component accessed the piece of information, and/or when the piece of information of accessed. Information may be retrieved from the datastore 22 to determine a history of write (storage) and read (access) actions by process components of the image capture device.

Information stored in the datastore 22 may be used to determine states (e.g., status) of the image capture device/ process components at different moments in time. For example, information stored in the datastore 22 at a particular moment may be copied and/or inspected to determine the states of the image capture device/process components at the moment in time. Information may be retrieved from the datastore 22 without breaking real-time behavior of the image capture device (e.g., spy on image capture device/ process components without behavior modification).

Information stored in the datastore 22 may be used to perform a complete replay of image capture device operations. The datastore 22 may store historical information and/or the information in the datastore 22 may be copied/ offloaded at different moments in time. Such information may be used to determine how the image capture device/ process components operated to retrieve input and/or generate output. Such information may be used to debug the image capture device/process components.

Information stored in the datastore 22 may be used to check and/or control the frequency of execution of different process components. Multiple process components may be executed to read information from and/or write information to the datastore 22 at the same time/rate. Multiple process components may be executed to read information from and/or write information to the datastore 22 at different times/different rates. Execution of the process components with respect to the datastore 22 (e.g., when process components accessed/stored information) may be checked to determine whether the process components are operating with correct timing/frequency.

Information stored in the datastore 22 may be used to increase efficiency of memory usage by the image capture device/process components. For example, memory usage may be optimized by adapting the size/depth of information storage in the datastore 22 according to memory usage by different process components. Memory efficiency may be obtained from the unique information storage provided by the datastore 22. Rather than saving duplicative information for use by different process components, information for different process components may be stored in a unique location/space within the datastore 22, and different process components may use the information from the same unique memory location/space. Different process component may read from and/or write to the same unique memory location/space.

The datastore architecture may be used for development and/or deployment of software and/or firmware for image capture devices (and/or other computing devices). For example, a single firmware may be developed for multiple types of image capture devices, and the firmware may be adjusted for the requirements of individual types of image capture devices as described herein. For instance, one or more process components may be activated/deactivated for a particular type of image capture device without code modification.

Indirect exchange of information between the process components via the datastore 22 may make the design of the process components flexible. Use of the datastore architecture may allow individual process components to be changed without having to change other process components/APIs. Similarly, the process components may be changed to remove an existing process component, replace an existing component with a new process component, or include multiple versions of the same process components.

In some implementations, indirect connections between different process components established through the datastore 22 may enable one or more existing process components to be changed or removed without a change in other existing process components For example, referring to FIG. 4, process component C3 413 may be changed to generate information D4 424 and store information D4 424 in the datastore 420 without changing how it generates information D2 422 and stores information D2 422 in the datastore 420. Process component C3 413 may be changed without change in existing process components C1 411 or C2 412.

In some implementations, indirect connections between different process components established through the datastore 22 may enable one or more new process components to be added without a change in existing process components. For example, referring to FIG. 4, a new process component C4 414 may be added (to retrieve and use information D4 424; to generate and store information D5 425) without changes to other process components. Process component C1 411 may be changed to receive information D5 425 without changes to other process components.

In some implementations, indirect connections between different process components established through the datastore 22 may enable multiple versions of a given process component to exist simultaneously. For example, referring to FIG. 4, the process components may be changed into include two different versions of process component C1 411 (C1 411 and C1' 431) without changing other process components. Multiple versions of the same process component may be run to determine behavior of the process component without breaking the global functionality of the image capture device.

Such modularization of the process component allows for separate development (e.g., creating, changing) of the process components without the need to agree on/coordinate changes to the API. Such modularization of the process component enables autonomy in process component development.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate utilizing a datastore for process component integration. The machine-readable instructions 100 may include one or more computer program components. The machine-readable instructions 100 may include one or more of a capture/process component 102, and/or other computer program components.

The capture/process component 102 may be configured to control capture and/or processing of visual content by the image capture device. Controlling capture of visual content by the image capture device may include determining/setting behavior/operation of the image capture device in capturing visual content. Controlling capture of visual content by the image capture device may include starting or stopping the capture of the visual content by the image capture device. Controlling capture of visual content by the image capture device may include determining how the visual content is captured by the image capture device. Controlling processing of visual content by the image capture device may include determining/setting behavior/operation of the image capture device in processing visual content. Controlling processing of visual content by the image capture device may include starting or stopping of one or more processing tools/algorithms to analyze, modify, and/or otherwise process the visual content. Controlling processing of visual content by the image capture device may include determining how the visual content is processed by the image capture device.

Capture and/or processing of the visual content by the image capture device may be controlled using one or more of the multiple process components executed by the image capture device. The capture/process component 102 may utilize (e.g., cause execution of) one or more process components to capture and/or process visual content. Information may be indirectly exchanged between different process components through the datastore 22. The datastore 22 may establish indirection connections between different process components executed by the image capture device.

For example, referring to FIG. 4, the process component C1 411 may not have direct connection with the process component C2 412. The process component C2 412 may retrieve information D2 422 from the datastore 420, process the information D2 422 to generate information D1 421, and store the information D1 421 in the datastore 420. The process component C1 411 may retrieve the information D1 421 from the datastore 420, process the information D1 421 to generate information D3 423, and store the information D3 423 in the datastore 420.

In some implementations, information stored in the datastore 22 may be retrievable without breaking real-time behavior of the image capture device. For example, referring to FIG. 4, the information D1 421, D2 422, D3 423, D4 424, and D5 425 may be retrieved from the datastore 420 without changing the behavior of the process components C1 411, C2 412, or C3 413.

In some implementations, the information stored in the datastore 22 may be retrieved to determine a state of the image capture device at a moment in time. For example, referring to FIG. 4, the information D1 421, D2 422, D3 423, D4 424, and D5 425 may be retrieved from the datastore 420 and inspected to determine the states of the image capture device/process components C1 411, C2 412, C3 413 at a particular moment in time. The information D1 421, D2 422, D3 423, D4 424, and D5 425 may be retrieved from the datastore 420 may provide a snapshot of the image capture device operation at a particular moment in time.

In some implementations, the information stored in the datastore 22 may be retrieved to determine a history of write and read actions by the multiple process components executed by the image capture device. For example, the information D1 421, D2 422, D3 423, D4 424, and D5 425 may be retrieved from the datastore 420 periodically and stored for analysis. The information D1 421, D2 422, D3 423, D4 424, and D5 425 retrieved at different times may be used to determine how the image capture device/process components C1 411, C2 412, C3 413 operated to retrieve input and/or generate output. Such information may be used to debug the image capture device/process components C1 411, C2 412, C3 413. Other use of information stored in the datastore is contemplated.

Figure 5:
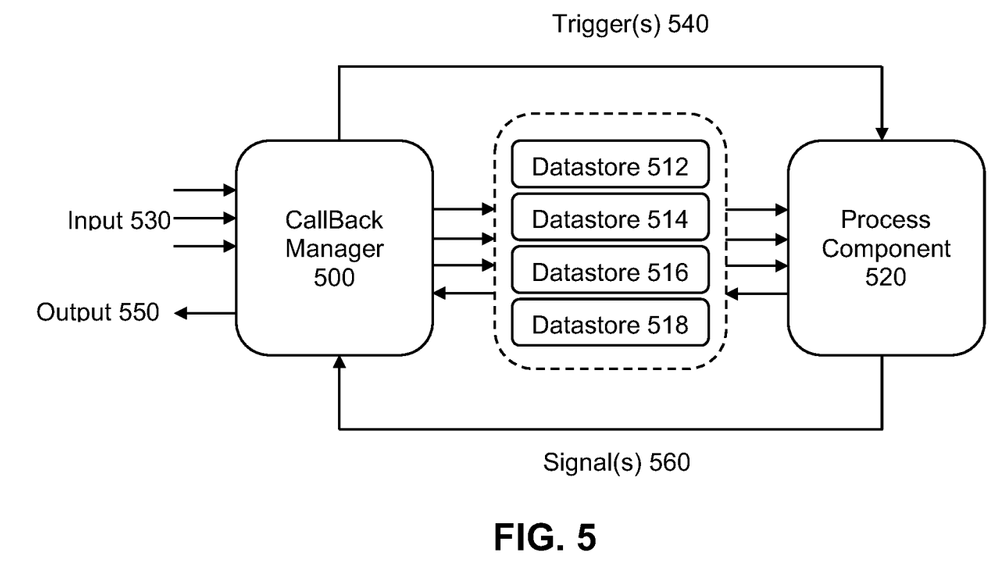
FIG. 5 illustrates an example storage and use of information in a datastore.

FIG. 5 illustrates an example storage and use of information in a datastore. A callback manager 500 may be in charge of updating information in one or more of datastores 512, 514, 516, 518. The callback manager 500 may receive input 530 and store the information received from the input 530 in the datastore(s) 512, 514, 516, 518. When information is ready to be read from the datastore(s) 512, 514, 516, 518, the callback manager 500 may use one or more triggers 540 to activate a process component 520. The trigger(s) 540 may indicate to the process component 520 that information is ready to be read from the datastore(s) 512, 514, 516, 518. The process component 520 may obtain information it needs to perform its function from the datastore(s) 512, 514, 516, 518. Information generated by the process component 520 may be stored in the datastore(s) 512, 514, 516, 518. Process component 520 may send one or more signal(s) 560 to the callback manager 500. The signal(s) 560 may indicate to the callback manager 500 that information is ready to be read from the datastore(s) 512, 514, 516, 518. The callback manager 500 may obtain information from the datastore(s) 512, 514, 516, 518 and provide the information as output 550.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

Figure 2:
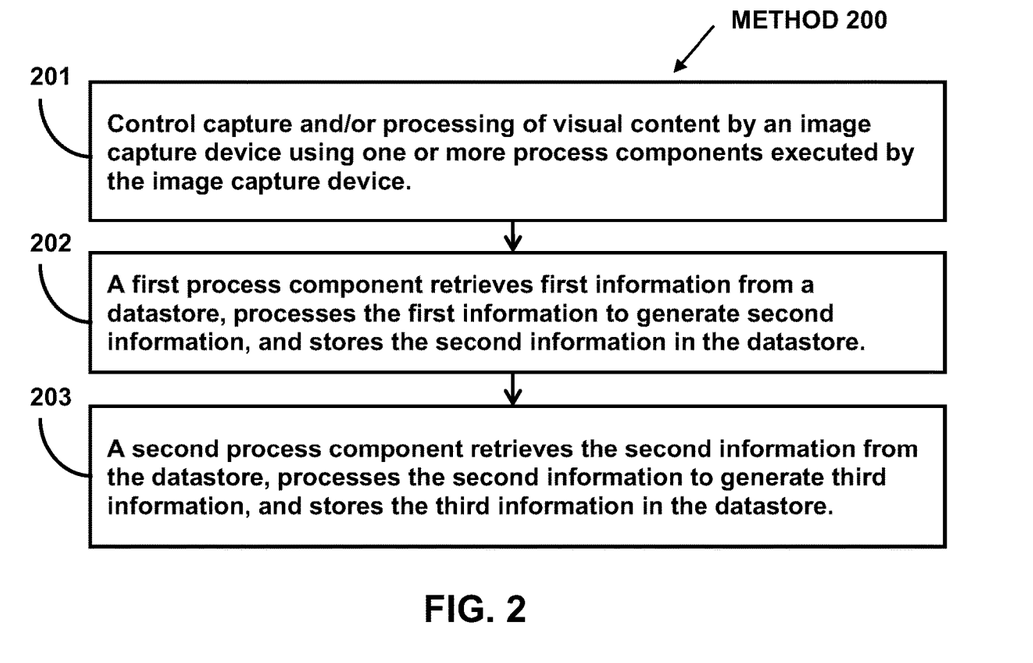
FIG. 2 illustrates an example method for utilizing a datastore for process component integration.

FIG. 2 illustrates method 200 for utilizing a datastore for process component integration. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include one or more of an image sensor, an optical element, non-transitory, machine-readable storage media, a processor, and/or other components. The image sensor may generate a visual output signal conveying visual information based on light that becomes incident thereon. The visual information may define visual content. The optical element may guide light within a field of view to the image sensor. The non-transitory, machine-readable storage media may store information organized in a datastore. The datastore may provide information storage for multiple process components executed by the image capture device. Information may be stored within the datastore so as to establish indirect connections between different process components with access to the datastore. Individual process components may not have direct connections with other individual process components. The datastore may establish indirect connection between a first process component and a second process component. The first process component may not have direct connection with the second process component.

At operation 201, capture and/or processing of the visual content by the image capture device may be controlled using one or more of the multiple process components executed by the image capture device. In some implementations, operation 201 may be performed by a component the same as or similar to the capture/process component 102 (Shown in FIG. 1 and described herein).

At operation 202, a first process component may retrieve first information from the datastore, process the first information to generate second information, and store the second information in the datastore. In some implementations, operation 202 may be performed using a component the same as or similar to the datastore 22 (Shown in FIG. 1 and described herein).

At operation 203, a second process component may retrieve the second information from the datastore, process the second information to generate third information, and store the third information in the datastore. In some implementations, operation 203 may be performed using a component the same as or similar to the datastore 22 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device, comprising:
   a housing;
   an image sensor carried by the housing and configured to generate a visual output signal conveying visual information based on light that becomes incident thereon, the visual information defining visual content;
   an optical element carried by the housing and configured to guide light within a field of view to the image sensor;

non-transitory, machine-readable storage media carried by the housing and configured to store information organized in a datastore, the datastore configured to provide information storage for multiple process components executed by the image capture device, the multiple process components executed by the image capture device including one or more firmware components and/or one or more software components, wherein information stored within the datastore establishes indirect connections between different process components with access to the datastore; and one or more physical processors configured by machine-readable instructions to control capture and/or processing of the visual content by the image capture device using one or more of the multiple process components executed by the image capture device, individual process components not having direct connections with other individual process components, wherein the datastore establishes indirect connection between a first process component and a second process component, the first process component not having direct connection with the second process component, wherein the first process component retrieves first information from the datastore, processes the first information to generate second information, and stores the second information in the datastore, and the second process component retrieves the second information from the datastore, processes the second information to generate third information, and stores the third information in the datastore, wherein the information stored within the datastore includes the first information, the second information, and the third information and the information stored within the datastore is retrievable by the multiple process components without breaking real-time behavior of the image capture device;

wherein:
the datastore is further configured to store related information on usage of the datastore by the multiple process components, the related information on the usage of the datastore by the multiple process components including information on which process component stored a piece of information in the datastore, when the piece of information was stored, which process component accessed the piece of information in the datastore, and when the piece of information was accessed; and the related information on the usage of the datastore by the multiple process components is retrieved from the datastore to determine a history of write and read actions by the multiple process components executed by the image capture device.

2. The image capture device of claim 1, wherein the information stored within the datastore is retrieved to determine a state of the image capture device at a moment in time and/or is copied or offloaded from the image capture device at different moments in time.

3. An image capture device, comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor;
non-transitory, machine-readable storage media carried by the housing and configured to store information organized in a datastore, the datastore configured to provide information storage for multiple process components executed by the image capture device, wherein information stored within the datastore so as to establishes indirect connections between different process components with access to the datastore; and one or more physical processors configured by machine-readable instructions to control capture and/or processing of the visual content by the image capture device using one or more of the multiple process components executed by the image capture device, individual process components executed by the image capture device not having direct connections with other individual process components, wherein the datastore establishes indirect connection between a first process component and a second process component, the first process component not having direct connection with the second process component, wherein the first process component retrieves first information from the datastore, processes the first information to generate second information, and stores the second information in the datastore, and the second process component retrieves the second information from the datastore, processes the second information to generate third information, and stores the third information in the datastore, wherein the information stored within the datastore includes the first information, the second information, and the third information;

wherein:
the datastore is further configured to store related information on usage of the datastore by the multiple process components, the related information on the usage of the datastore by the multiple process components including information on which process component stored a piece of information in the datastore, when the piece of information was stored, which process component accessed the piece of information in the datastore, and when the piece of information was accessed; and the related information on the usage of the datastore by the multiple process components is retrieved from the datastore to determine a history of write and read actions by the multiple process components executed by the image capture device.

4. The image capture device of claim 3, wherein the information stored within the datastore is copied or offloaded from the image capture device at different moments in time.

5. The image capture device of claim 3, wherein the information stored within the datastore is retrievable without breaking real-time behavior of the image capture device.

6. The image capture device of claim 5, wherein the information stored within the datastore is retrieved to determine a state of the image capture device at a moment in time.

7. The image capture device of claim 3, wherein the indirect connections between the different process components established through the datastore enables an existing process component to be changed or removed without a change in other existing process components.

8. The image capture device of claim 3, wherein the indirect connections between the different process components established through the datastore enables a new process component to be added without a change in existing process components.

9. The image capture device of claim 3, wherein the indirect connections between the different process components established through the datastore enables multiple versions of a given process component to exist simultaneously.

10. The image capture device of claim 3, wherein the multiple process components executed by the image capture device include one or more firmware components.

11. The image capture device of claim 3, wherein the multiple process components executed by the image capture device include one or more software components.

12. A method for utilizing a datastore for process component integration, the method performed by an image capture device including one or more processors, an image sensor, an optical element, and non-transitory, machine-readable storage media, the image sensor configured to generate a visual output signal conveying visual information based on light that becomes incident thereon, the visual information defining visual content, the optical element configured to guide light within a field of view to the image sensor, the non-transitory, machine-readable storage media configured to store information organized in the datastore, the datastore configured to provide information storage for multiple process components executed by the image capture device, wherein information stored within the datastore so as to establishes indirect connections between different process components with access to the datastore, the method comprising:
  controlling capture and/or processing of the visual content using one or more of the multiple process components executed by the image capture device, wherein:
    individual process components executed by the image capture device do not have direct connections with other individual process components;
    the datastore establishes indirect connection between a first process component and a second process component, the first process component not having direct connection with the second process component;
    the first process component retrieves first information from the datastore, processes the first information to generate second information, and stores the second information in the datastore; and
    the second process component retrieves the second information from the datastore, processes the second information to generate third information, and stores the third information in the datastore, wherein the information stored within the datastore includes the first information, the second information, and the third information;

wherein:
    the datastore is further configured to store related information on usage of the datastore by the multiple process components, the related information on the usage of the datastore by the multiple process components including information on which process component stored a piece of information in the datastore, when the piece of information was stored, which process component accessed the piece of information in the datastore, and when the piece of information was accessed; and
    the related information on the usage of the datastore by the multiple process components is retrieved from the datastore to determine a history of write and read actions by the multiple process components executed by the image capture device.

13. The method of claim 12, further comprising retrieving the information stored within the datastore without breaking real-time behavior of the image capture device.

14. The method of claim 13, further comprising determining a state of the image capture device at a moment in time based on retrieval of the information stored within the datastore.

15. The method of claim 12, wherein the information stored within the datastore is copied or offloaded from the image capture device at different moments in time.

16. The method of claim 12, wherein the indirect connections between the different process components established through the datastore enables an existing process component to be changed or removed without a change in other existing process components.

17. The method of claim 12, wherein the indirect connections between the different process components established through the datastore enables a new process component to be added without a change in existing process components.

18. The method of claim 12, wherein the indirect connections between the different process components established through the datastore enables multiple versions of a given process component to exist simultaneously.

19. The method of claim 12, wherein the multiple process components executed by the image capture device include one or more firmware components.

20. The method of claim 12, wherein the multiple process components executed by the image capture device include one or more software components.

* * * * *